Jan. 5, 1965     D. B. WOODS     3,164,039
INTERNAL TUBE FINISHING MACHINE
Filed Aug. 31, 1962                     3 Sheets-Sheet 1
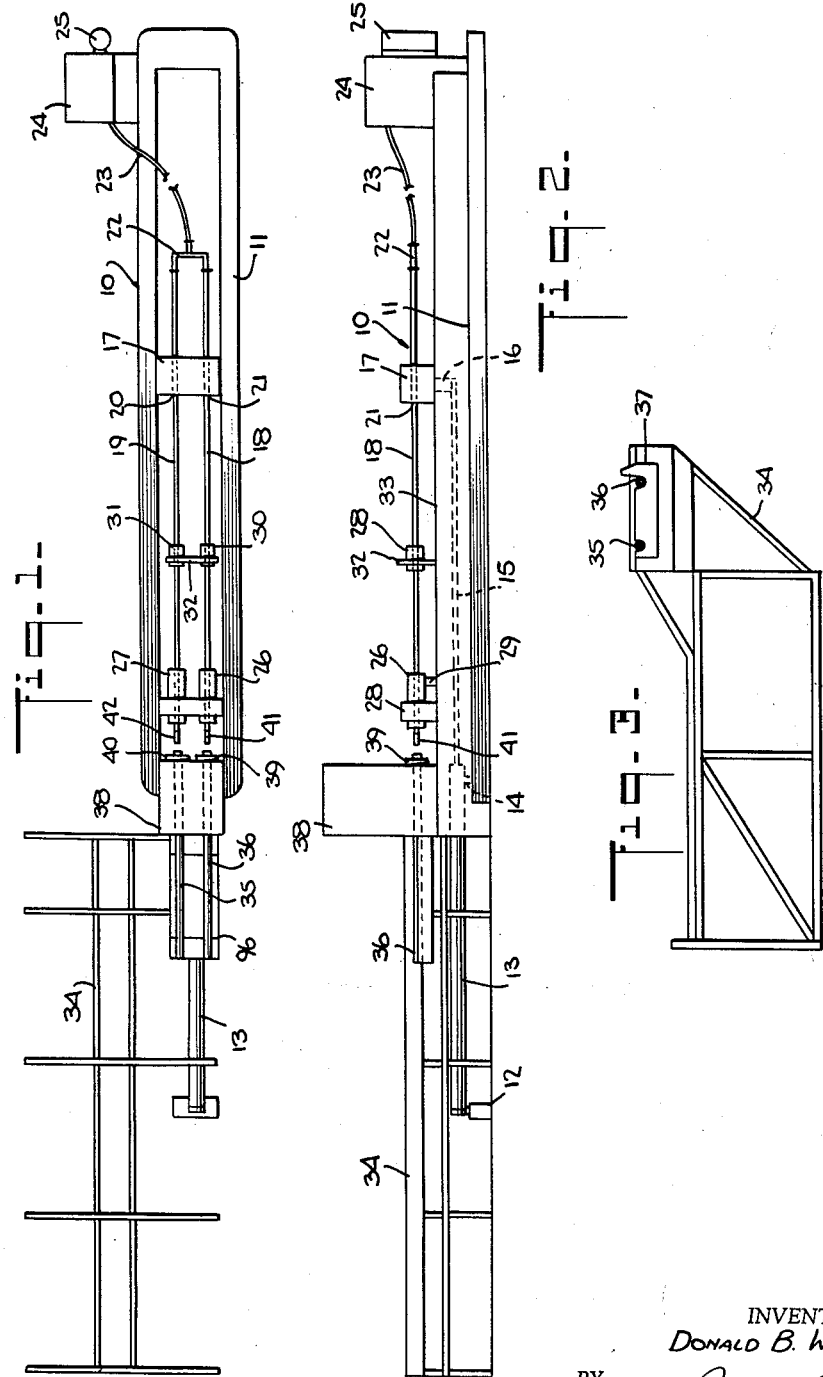
INVENTOR.
DONALD B. WOODS
BY
ATTORNEY

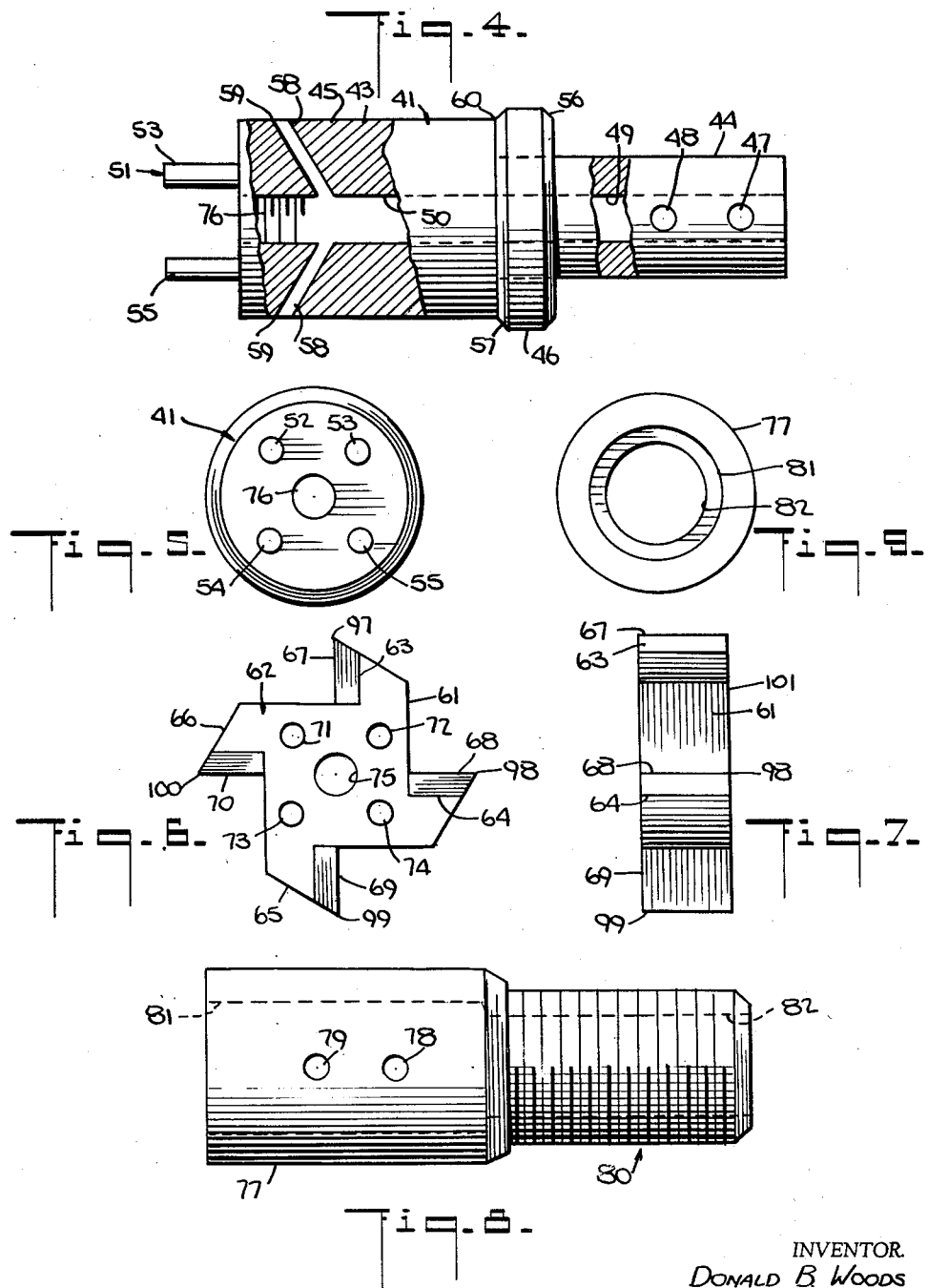

Jan. 5, 1965  D. B. WOODS  3,164,039
INTERNAL TUBE FINISHING MACHINE
Filed Aug. 31, 1962  3 Sheets-Sheet 3

INVENTOR.
DONALD B. WOODS
BY
*[signature]*
ATTORNEY

United States Patent Office 3,164,039
Patented Jan. 5, 1965

3,164,039
INTERNAL TUBE FINISHING MACHINE
Donald B. Woods, Huntington, W. Va., assignor to The International Nickel Company, Inc., New York, N.Y., a corporation of Delaware
Filed Aug. 31, 1962, Ser. No. 220,721
3 Claims. (Cl. 77—1)

The present invention relates to metal processing, and, more particularly, to reaming.

It is well known that reaming is the enlarging and/or finishing of a previously drilled, cored, extruded, etc., hole to provide a good finish as well as more accurate dimensions. It is, of course, very desirable that the reaming operation be done to reasonably close tolerances so that the need for further finishing operations can be eliminated or at least minimized. Best results are obtained by the use of reaming equipment, i.e., reamers, in which the cutting tool floats. If the cutting tool floats, it can be aligned more evenly in the hole and thus ream the hole to the desired size throughout the length of the work.

Heretofore, reaming apparatus has been designed and put to use which, at least at the onset of the reaming operation, properly aligns the cutting tool in the hole and with relation to the work, e.g., a tube. One such apparatus comprises a tool holder and/or arbor having a cutting tool and a guide (pilot) which guide is adapted to bear evenly against the inner wall of the tube after the cutting tool has reamed a portion of the tube. In other words, the guide follows the cutting tool through the hole in the tube. The guide must, of course, have an outside diameter that is substantially equivalent to, or slightly larger than, the desired finished inside diameter of the tube. In general, the guide is made of wood and is fastened to a tool holder by means of nuts, bolts, etc. One principal disadvantage of the previously described reaming apparatus is that the turnings, shavings, chips, etc., formed by the cutting action of the tool necessarily move in a direction countercurrent to the guide so that whenever the guide comes into contact with the metal turnings, etc., damage is done to the guide and to the tube since contact is unavoidable. This necessitates the frequent replacement of guides which is not only costly but also very time consuming. Furthermore, since the guide follows the cutting tool in certain prior art apparatus, the guide must have openings along its circumference so that the turnings, etc., are able to pass through the guide and out the tube. These guides, having openings for the passage of turnings, are, of course, not as advantageous as guides having a continuous surface.

Although many attempts were made to overcome the foregoing difficulties and other disadvantages, none, as far as I am aware, was entirely successful when carried into practice commercially on an industrial scale.

It has now been discovered that holes in metal objects can be more economically reamed to close tolerances.

It is an object of the present invention to provide new apparatus for reaming having a unique combination of cooperative parts and/or components.

Another object of the present invention is to provide novel apparatus for reaming which apparatus requires a minimum of part replacement even after long periods of use.

The invention also contemplates providing a special assembly for reaming which is easily unitable.

The invention also contemplates a novel arbor having a combination of parts and/or components which are in special spaced relationship to each other.

Still another object of the invention is to provide a novel process for reaming which process minimizes part and/or component replacement.

Other objects and advantages will become apparent from the following description taken in conjunction with the accompanying drawings in which:

FIGURE 1 is a top view of a reaming apparatus within the scope of the present invention;

FIGURE 2 illustrates a front view of the reaming apparatus of FIGURE 1;

FIGURE 3 shows an end view of a tube table of the aforementioned reaming apparatus illustrated in FIGURE 1;

FIGURE 4 is a top view, partly in cross-section, of an arbor within the contemplation of the present invention;

FIGURE 5 represents a side view of the arbor of FIGURE 4;

FIGURE 6 shows a front view of a cutting tool or reamer which is adapted to be connected to the arbor illustrated in FIGURES 4 and 5;

FIGURE 7 illustrates a side view of the cutting tool of FIGURE 6;

FIGURE 8 is a top view of a reamer adapter within the contemplation of the present invention;

Figure 10:
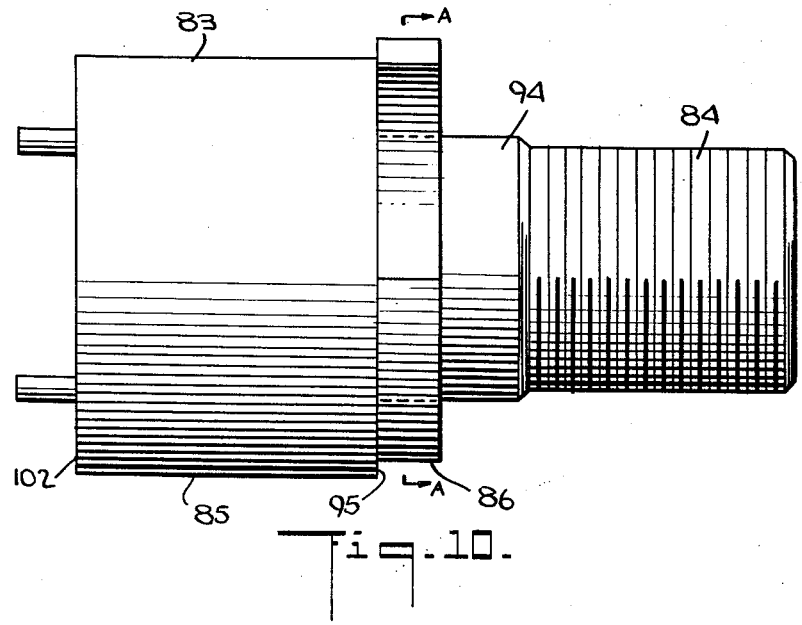
Figure 11:
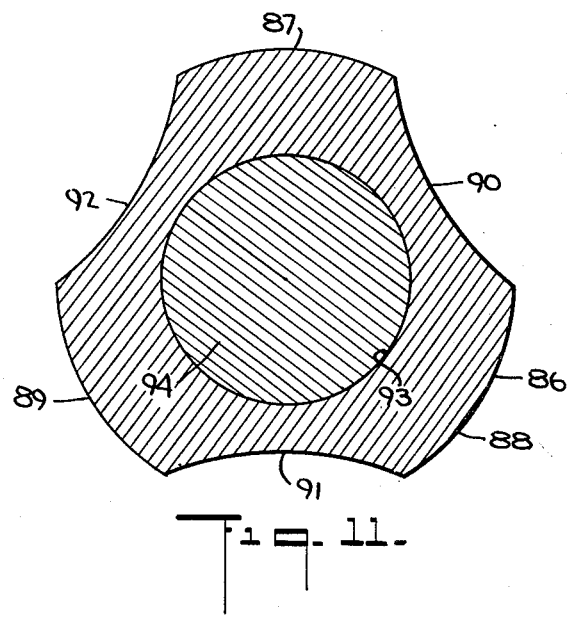

FIGURE 9 exhibits a side view of the reamer adapter of FIGURE 8;

FIGURE 10 is a side view of another arbor within the contemplation of the present invention; and FIGURE 11 is a cross-sectional view of the arbor of FIGURE 10 taken along line A—A of FIGURE 10.

Generally speaking, the present invention contemplates a novel internal tube finishing machine, i.e., an apparatus for reaming an unfinished, inside, substantially cylindrical surface of an elongated workpiece, e.g., a tube. The reaming apparatus comprises a body having tool-receiving means, an oil-resistant, resilient, cutting tool pilot concentrically and perimetrically attached to the body and a cutting tool so attached to the tool-receiving means that a cutting portion of the cutting tool faces toward the cutting tool pilot, i.e., the cutting edge of the cutting tool lies intermediate the pilot and the rear of the cutting tool. In addition, the reaming apparatus is provided with means for causing a relative rotational movement between the workpiece and the cutting tool as well as means for causing a relative longitudinal movement between the workpiece and the tool. Means may also be provided in conjunction with the aforementioned other elements, components and/or parts of the remaining apparatus for removing the reamed tubes from the apparatus.

Reaming apparatus having the foregoing features in the heretofore set forth cooperative relationships has at least a five-fold advantage. Firstly, the features are so combined that the pilot precedes the cutting tool through the workpiece. The advantage of such a structure is that the pilot rarely, if ever, contacts any of the stock removed, e.g., chips, turnings, etc., from the workpiece by the tool as the chips, etc., necessarily flow back from the tool in the stream of cutting fluid provided. Thus, damage to the pilot caused by the contact of the chips, etc., with the pilot is substantially obviated. Furthermore, since the pilot bears against the inside surface of the workpiece to be reamed, any chips, etc., which might possibly flow toward the pilot could not cause any serious damage to the interior workpiece surface as the reaming operation is not as yet completed. Secondly, since the pilot is rarely, if ever, damaged by the stock removed, the pilot is usable over and over again without any need for replacement. Thirdly, the pilot because of its dimensional integrity throughout the reaming operation affords relatively accurate support for the cutting tool. Fourthly, the arrangement of the components, elements and/or parts permits the use of a pull-type longitudinal driving means which is advantageous since the drive rods are under tension and there is no practical possibility for the drive rods to buckle as is the case with push-type driving means. Fifthly, because the pilot precedes the cutting tool, it is possible to inject coolants (cutting fluids) into the workpiece and against the cutting tool that do not contact the pilot whatsoever so that pilot-life may be increased.

The pilot, advantageously, has a continuous, circular cross-section although discontinuous, circular, cross-sectional pilots are also within the scope of the present invention as those skilled in the art will readily appreciate. Since the pilot is attached to the body, the pilot advantageously has an annular geometric configuration. This annular configuration allows the pilot to bear evenly against the internal surface of the workpiece to be reamed and thus affords truer alignment of the tool in the workpiece. The pilot is, advantageously, made of neoprene. However, other resilient, oil-resistant, elastomeric materials such as rubber-like materials made by the polymerization of butadiene, nylon, certain plastics, wood, etc., may also be employed as the pilot material, as those skilled in the art will readily understand.

In carrying the invention into practice, it is advantageous to provide the reaming apparatus with a coolant source so that a cutting fluid can be fed to the workpiece and/or the cutting tool during the reaming operation to cool the workpiece and/or cutting tool. More advantageously, as was pointed out hereinbefore, the coolant is fed into the cutting tool such that the coolant does not contact the pilot. Thus, the body having the tool-carrying means advantageously is provided with a coolant-carrying and coolant-receiving means extending at least a portion of the length of the body and with coolant exit ports angularly radiating from the coolant-carrying and coolant-receiving means and extending to a portion of the body intermediate the pilot and the tool-carrying means.

Referring now to the drawings, FIGURES 1 and 2 depict a tube reaming apparatus 10 within the contemplation of the present invention. The reaming apparatus 10 has a bed 11 and a concrete pier 12 for holding, at one end, the hydraulic cylinder 13. At the other end, the hydraulic cylinder is bolted to the bed 11 at 14. The cylinder has a piston 15 connected to a mounting bracket 16 which, in turn, is bolted to a movable carriage 17. Two lengths of pipe 18 and 19 are fixed into the movable carriage at 20 and 21 and are extended through the carriage 17 at both sides. One end of each pipe 18 and 19 is connected to a T 22 which is connected to a flexible hose 23. The hose 23, at its other end, is attached to a coolant chamber 24 having a pump 25. The pipes 18 and 19 pass, at their other ends, through wood pilot blocks 26 and 27 which rest on a steady rest 28 and a pier 29. Instead of wood pilot blocks, it is also within the scope of this invention to use split bronze bushings to align the pipes 18 and 19. In order to support the pipes, center support brackets 30 and 31 are provided. These brackets are held in spaced relationship to each other by prop 32 affixed to the bed 33. The reaming apparatus is also provided with a table 34 for holding tubes 35 and 36 which are to be reamed (see FIG. 3 also). The table 34 has a partition 37 for inhibiting the movement of tubes 35 and 36 during the reaming operation. In addition, the partition 37 aids in the alignment of the tubes 35 and 36 in the reaming apparatus. The tubes pass through headstock 38 and into 3-jaw universal chucks 39 and 40, which not only hold the tubes but also have mechanisms (not shown) for rotating them. Arbors 41 and 42 are attached to pipes 18 and 19 and are aligned with tubes 35 and 36. The reaming apparatus may also be provided with a water bath 96 whenever it is desired to cool the exterior of the tubes 35 and 36 during reaming.

Arbors (reamer heads) 41 and 42 are identical so that the hereinafter description of arbor 41, particularly with regard to FIGS. 4 and 5, also includes arbor 42. Arbor 41 comprises a body 43 having a concentric neck 44 and a concentric shank 45 and a concentric annular pilot 46. While the body is shown as being made of one piece, it can be made unitary by joining a separate neck 44 to a separate shank 45 by welding, bolts, screws, etc. At the juncture of the neck 44 and the shank 45 is shoulder 60. The neck 44 is provided with reamed holes 47 and 48 and a concentric coolant-carrying and coolant-receiving means 49 which communicates with coolant-carrying and coolant-receiving means 50 of the shank 45. The coolant-carrying and coolant-receiving means 50 is concentric with shank 45. Radiating from the coolant-carrying and coolant-receiving means are coolant exit ports 58 which terminate on the outer surface of the body 43 (shank portion) at 59 which is intermediate the pilot and the tool-receiving means. The shank 45 also has tool-receiving means 51 comprising four pins 52, 53, 54 and 55. Of course, it is to be appreciated that other tool-receiving means can also be employed, as those skilled in the art will readily understand. The pins 52 to 55 are fixed into sockets (not shown) in the shank 45. The pilot 46 is chamfered at 56 and 57 to facilitate movement of the pilot in the tube being reamed. The pilot is attached to the body 43 by slipping it over the neck 44 and resting it against the shoulder 60. The inside diameter of the pilot is substantially equal to the outside diameter of the neck. However, the shank may be provided with a collar (not shown) over which the pilot can be fitted so that the pilot can be attached to the body by slipping it over the shank. This arrangement fixes the pilot so that it cannot move in either direction. The outside diameter of the pilot is, of course, at least as large as the inside diameter of the workpiece to be reamed.

A cutting tool or reamer 61 having a back or rear portion 101 (see FIGURES 6 and 7) comprises a spider 62 having projections 63, 64, 65 and 66 for receiving cutters 67, 68, 69 and 70, respectively. The cutters have cutting portions 97, 98, 99 and 100 and they face toward the pilot, i.e., the pilot is frontwards of the cutting portions of the cutter. The tool 61 is aligned to the tool-receiving means 51 by providing holes 71, 72, 73 and 74 which are adapted to snugly slip over pins 52 to 55, respectively. In order to affix the tool 61 to the shank 45, the spider 62 is provided with a hole 75 which communicates with tapped hole 76 in the shank 45 of the arbor 41. The tool 61 is then bolted (not shown) to the shank 45. While the tool is shown to be an end-cutting tool, it can also be a side-cutting reamer, rose reamer, etc., as those skilled in the art will readily understand.

Advantageously, a reamer adapter 77 is provided which is adapted to be slipped over neck 44 and fastened to the neck 44 by means of pins (not shown) inserted through holes 78 and 79 and through holes 47 and 48, respectively, of neck 44 with which holes 78 and 79 are aligned when adapter 77 and neck 44 are assembled. The reamer adapter is threaded at one end 80 so that it can be attached to the driving pipe 18. In addition, the reamer adapter 77 is provided with coolant-carrying and coolant-receiving means 81 which is concentric to the reamer adapter 77 and which is adapted to communicate with coolant-carrying and coolant-receiving means 49 of neck 44. As shown in FIGS. 8 and 9 that portion of the coolant-carrying and coolant-receiving means in the threaded portion 80 has a smaller diameter 82 than the remainder of the coolant-carrying and coolant-receiving means of the reamer adapter. Of course, the coolant-carrying means of the threaded portion 80 could have a diameter the same as, for larger than, the diameter of means 81, as those skilled in the art will readily appreciate.

The present invention also contemplates a process for reaming the unfinished, inside surface of a workpiece, e.g., the internal diameter of a tube. In general, this process comprises inserting a reamer assembly having a pilot and a cutting tool into the workpiece such that the reamer assembly is supported by the pilot and such that the pilot bears against the unfinished, inside surface, i.e., the surface to be reamed, of the workpiece, A relative longitudinal movement between the reamer assembly and the workpiece is then initiated while, at the same time, causing a relative rotational movement between the workpiece and the cutting tool and while maintaining the pilot in contact with the unfinished, inside surface of the workpiece substantially throughout the length of the workpiece. This process, when adhered to, causes the cuttings made by stock removal to flow away from the pilot and thereby substantially inhibits damage to the pilot and/or to the finished tube. Thus, pilot-life is increased. Advantageously, the reamer assembly is pulled through the finished workpiece and/or tube and a coolant, e.g., a water-dispersed saponifiable oil, is passed countercurrent to the relative longitudinal movement of the assembly through the tube. In such a case, not only does the coolant perform its intended function (cooling) but it also assists in washing the stock removed from the tube by the action of the cutting tool away from the pilot and cutting tool as well as out of the tube altogether. Advantageously, the tube is caused to rotate. However, it is also within the scope of this invention to cause the cutting tool to be rotated instead or to rotate both the tube and cutting tool at the same time in opposite directions as those skilled in the art will readily understand.

In general, the cutting fluids (coolants) used in the reaming apparatus and processes of this invention are similar to those used in the prior art reaming operations and apparatus. Thus, nickel and nickel alloys are appropriately reamed with saponifiable oils containing at least about 10% sulfur. Aluminum and its alloys, while they can oftentimes be reamed dry, are, advantageously, reamed with kerosene or kerosene mixed with a lard oil in equal parts. In addition, turpentine may also be added to the kerosene-lard oil mixture. Paraffin-base mineral oils, generally used on brasses, are unsuitable for aluminum. Steel is generally suitably reamed with a mineral-lard oil or sulfurized lard-mineral oil as are the hard bronzes. Medium-hard bronzes can be reamed with a light mineral oil. Of course, there are many other cutting fluids which may be employed as those skilled in the art will readily appreciate. On the other hand, cast iron can be, and is usually, reamed dry.

For the purpose of giving those skilled in the art a better understanding of the invention and a better appreciation of the advantages of the invention, the following illustrative example is given:

*Example*

Two, 15' lengths of nickel-chromium alloy tubes nominally containing, by weight, about 76% nickel, about 15.8% chromium and about 7.2% iron were placed in the reaming apparatus 10 of this invention at 35 and 36. Each tube had an outside diameter of about 3¼" and a ½" wall thickness. The movable carriage 17 was in the position as shown in FIG. 1. Arbors, having annular, neoprene pilots were mounted onto the driving mechanism as shown in FIG. 1. The hydraulic cylinder 13 was then actuated so that the arbors passed entirely through the nickel-chromium alloy tubes to be reamed. Cutting tools 61 were then bolted to the arbors. The coolant pump 25 was put into operation. The coolant used was a proprietary saponifiable oil containing about 10% of sulfur. The tubes were rotated at 212 revolutions per minute while the cutting tools were pulled through the tubes at the rate of 0.1" per revolution. One pass was made and the stock removal was about 0.017" from each tube. The roughness height, a standard indication of surface finish, was found to average only about 62 microinches for each tube as determined by the root mean square method. This is so good that for many applications further finishing operations need not be conducted on the tubes. In addition, each annular, neoprene pilot was found to have a useful life for about 250 reamings without the necessity of a change. In contrast thereto, using push-type reaming apparatus having a wooden guide following the cutting tool through the tube, it was found that such a following guide had a useful life for about 2 tubes.

The foregoing elements constitute the basic parts making up the apparatus. Other elements can be added or elements can be altered to meet a particular need for a particular situation. For example, in FIGS. 10 and 11 there is depicted an arbor 83 having a concentric pilot 86 which arbor eliminates the need for a reamer adapter as it is threaded at 84 and is thereby adapted to be screwed into pipe 18 or pipe 19 directly. In addition, the body 85 of the arbor is solid. The pilot 86 has three projections 87, 88 and 89 adapted to bear against the unfinished, inside surface of tubes 35 and 36 which are to be reamed. The open areas 90, 91 and 92 allow a coolant to be passed through the tube and the open areas of the pilot to the cutting tool which is affixed to end portion 85 of the body at 102. The pilot is also provided with a hole 93 which has substantially the same diameter as portion 94. Thus, pilot 86 is slipped over the body and rests against shoulder 95.

The present invention is particularly applicable to the finishing of inside diameter of a tube having a drilled, cored, extruded, etc., hole in which accuracy is a requirement and further finishing operations are to be avoided. In addition, the arbor of the present invention can also serve as a honing arbor and may even be easily adapted for use in polishing operations. The apparatus of this invention is, of course, useful in the reaming of many metals and alloys including iron, iron-base alloys, nickel, nickel-base alloys, copper, copper-base alloys, aluminum, aluminum-base alloys, etc.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

I claim:

1. A pull type reaming apparatus for use in reaming an unmachined, substantially cylindrical, inside surface of a tubular workpiece comprising an elongated body having a forward end and a rearward end, an oil-resistant cutting-tool pilot characterized by an annular ringlike configuration attached to the body intermediate the said forward and rearward ends and having an outside diameter at least equal to the diameter of the unmachined inside surface of the workpiece, said annular ringlike cutting-tool pilot being of a material possessing high resiliency whereby the pilot is particularly adapted to respond by self-adjustment to irregularities of the said inside surface, a floatable end-cutting tool having a cutting portion facing toward the pilot and being rigidly attached to the body rearward of the annular ringlike pilot whereby the floating action of the cutting tool in conjunction with said annular ringlike pilot results in the cutting tool being evenly aligned within the said workpiece as it passes therethrough, thus providing for the attainment of a reamed tubular hole characterized by a high degree of surface smoothness and of substantially constant dimension throughout the length thereof, drive-attaching means on the body and forward of the pilot, pull-type longitudinal driving means for exerting tension force attached to the drive-attaching means, at least one coolant exit port in the body intermediate the pilot and the cutting tool, coolant-receiving means in the body forward of the pilot and coolant-carrying means in communication with said exit port and said coolant-receiving means.

2. A reaming apparatus as set forth in claim 1 wherein the pilot is of neoprene.

3. A reaming apparatus as set forth in claim 1 wherein the pilot is chamfered to facilitate movement of the pilot in the workpiece.

References Cited by the Examiner

UNITED STATES PATENTS

| 2,014,679 | 9/35 | Eckroate | 77—3 |
| 2,283,497 | 5/42 | Fields | 77—58 |
| 2,334,795 | 11/43 | Smith | 77—58 |
| 2,741,936 | 4/56 | Wohlfahrt | 77—3 |
| 2,873,632 | 2/59 | Bissey | 77—58 |

OTHER REFERENCES

American Machinist, vol. 56, No. 10, March 9, 1922, page 375 relied on.

LEON PEAR, *Primary Examiner.*

JOHN C. CHRISTIE, *Examiner.*